United States Patent Office 2,782,633
Patented Feb. 26, 1957

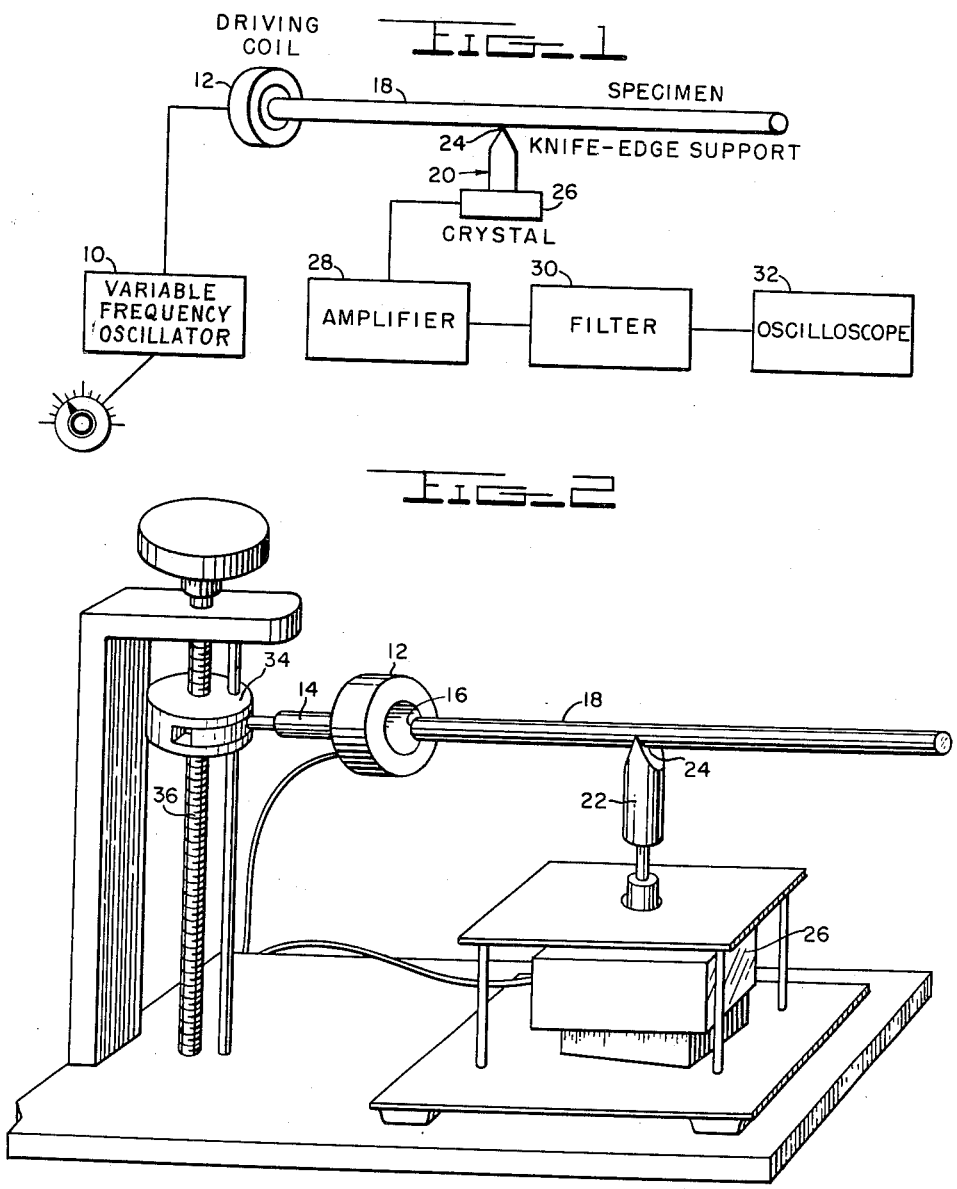

2,782,633

APPARATUS FOR DETERMINING ELASTIC CONSTANTS

Henry E. Stauss, Alexandria, Va., Frank E. Martin, Washington, D. C., and Douglas S. Billington, Oak Ridge, Tenn.

Application January 14, 1952, Serial No. 266,434

3 Claims. (Cl. 73—67.2)

(Granted under Title 35, U. S. Code (1952), sec. 266)

This invention relates to novel apparatus for determining the elastic constants of a metal.

In the prior art there is known of static means for determining elastic properties of metals and, in recent years, "dynamic" means have been used to obtain this information. One "dynamic" means, in common use, is to have a piezoelectric crystal drive a mechanical bar which is glued to the crystal. By adjusting the length of the bar until the resonant frequency of the bar and crystal is the same as the resonant frequency of the crystal alone, one knows that the length of the bar is an integral number of half wavelengths at the frequency of the crystal. Knowledge of resonant frequencies and corresponding specimen lengths is utilized in calculating the desired elastic constants. The instrumentation detailed above has certain disadvantages, one being that the crystal is cemented to the specimen bar, another being that the adjustment in length of the latter is cumbersome.

Accordingly it is an object of this invention to provide a novel apparatus for determining the elastic constants of metals wherein no crystals or other elements are cemented to the specimen bar.

It is a further object of this invention to provide a novel apparatus for determining the elastic constants of a metal once the specimen bar has been positioned in the apparatus.

It is a further object of this invention to provide a novel apparatus for determining the elastic constants of metals which is equally useful for magnetic and non-magnetic metals.

It is a further object of this invention to provide a novel apparatus for determining the elastic constants of metals wherein large specimens, readily cut from forgings, or from castings if necessary, may be utilized.

It is a further object of this invention to provide a novel apparatus for determining elastic constants wherein the driving field cannot directly energize the pick-up.

It is a further object of this invention to provide a novel apparatus for determining elastic constants of metallic specimens by vibration analysis whereby an indication of the vibration may be transmitted to a non-adjacent vibration detecting means.

For a further comprehension of the invention, and of the objects and advantages thereof, reference will be had to the following description and accompanying drawings, and to the appended claims in which the various novel features of the invention are more particularly set forth.

Referring now to the drawings wherein a preferred embodiment of the novel apparatus is shown:

Figure 1 is a showing of the novel apparatus partly in block diagram and partly in elevation;

Figure 2 is an elevation view of the specimen bar and accessory equipment.

The invention, in broad terms, contemplates subjecting an elongated specimen of uniform cross-section to vibrations and determining its resonant frequencies. The relationship between the resonant frequency of a bar, its length and density, and the elastic modulus corresponding to a given mode of vibration is known in each case, with the effect that calculation of elastic moduli may be based on resonant frequencies; all the elastic constants of a given specimen may be calculated from values for any two of the moduli. The specimen is supported at a node, the support also serving as an acoustical link between the specimen and an electro-mechanical transducer, such as a piezoelectric crystal pick-up. The signal detected by the transducer is amplified and then impressed on some form of resonance indicator, such as an oscilloscope. Vibrations are induced in the specimen by a driving coil mounted on a permanent magnet core. It should be noted that the end face of the elongated specimen is brought as close as possible to the magnet core without making contact.

Referring now to Figure 1, wherein one preferred embodiment of the invention is shown. An audio oscillator 10 is used to supply energy at desired frequencies. These frequencies are supplied to a driver coil 12 which is mounted upon a permanent magnet core 14. The end face 16 of a specimen bar 18, which may be a magnetic or non-magnetic metal, is brought as close as possible to the magnet core 14 without their making contact. If it is desired to determine the elastic constants of a ferromagnetic specimen, a piece of felt may be used to keep the face of the magnet core 14 separated from the end face 16 of the specimen bar 18.

As shown in both Figures 1 and 2, the specimen bar 18 is, in the preferred embodiment, supported at its central node. It is supported by an acoustical probe 20. This acoustical probe 20 consists of a rod 22 ending in a knife-edge 24. The center of the knife-edge 24 is formed to have a shallow depression of slightly greater diameter than that of the specimen bar 18. Accordingly, it can be seen that the specimen bar 18 can be balanced in the depression of the knife-edge 24 without any other means of restraint or support. Further, the width of contact between the specimen bar and the depression of the knife-edge 24 constitutes only a small fraction of the length of the specimen bar 18. This method of support, disclosed by the novel apparatus, does not affect resonant frequencies for longitudinal vibrations.

Specimen bars approximately 1 foot long and ½ inch in diameter were found a convenient size to be used with the novel apparatus. However, it should be noted that these dimensions are not to be considered limiting. A 5 foot bar having a 2 inch diameter could just as readily be used. For specimens having the dimensions given, namely, 1 foot long and ½ inch diameter, useful resonant frequencies fall between 3000 and 9000 cycles per second. The electro-mechanical transducer 26 is made of a crystal of Rochelle salt with a resonant frequency of 1400 C. P. S. and is fairly sensitive up to about 12,000 cycles per second. Frequencies below 3000 cycles per second were of little use because at these frequencies pronounced broad resonances were encountered.

The energy picked up by the crystal 26 is amplified in the amplifier 28, passed through a high pass filter 30, and then impressed on the oscilloscope 32. The high pass filter 30 is used to obtain sharp indications of resonance with the oscilloscope 32 by keeping the effects of stray low-frequency pick-up as small as possible.

It should be noted that the oscillator 10, the amplifier 28, the filter 30, and the oscilloscope 32 may be of conventional construction and by themselves possess no novelty.

As shown in Figure 2, the permanent magnet core 14 and the driver coil 12 are mounted upon an adjustable connector 34 whereby the driving means may be angularly positioned about the axis of the threaded shaft 36.

The adjustable connector 34 engages the threaded shaft 36 so that the magnet core 14 and the driver coil 12 may be adjusted in height with respect to specimen bar 18. By having the faces of the driver coil 12 and the specimen bar 18 parallel, maximum resonance of a longitudinal character may be obtained. Finally, maximum resonance of a flexural character may be obtained by displacing the driver coil 12 with respect to the specimen bar 18 while keeping their axes parallel.

Thus to determine Young's modulus use may be made of the formula:

$$E = 4N^2 l^2 \frac{P}{12g}$$

where $E$ = Young's modulus in pounds per square inch
$N$ = fundamental resonant frequency in cycles per second
$l$ = specimen length in inches
$P$ = density in pounds per cubic inch
$g$ = acceleration of gravity in feet per second.

The values of $l$ and $g$ are known and the value of $N$ may be obtained from the oscillator 10 when the oscilloscope 32 indicates a condition of resonant frequency with respect to the specimen bar 18 has been reached. This is done by adjusting the frequency of oscillator 10 until a minimum pick-up is observed on the oscilloscope. This indicates that a node now exists on the bar at the location of the probe. The value of the other elastic constants may be calculated in a similar manner.

It is within the purview of this invention to have the specimen bar 18 supported by means other than the acoustical probe 20 and to have the acoustical probe 20 positioned at the central node to serve only as an acoustical probe; also that, in case of multiple nodes on the specimen, it might be supported at any node, with the probe being used only as a probe at any remaining node.

From the foregoing description of the present invention, it is apparent that considerable modification of the features thereof is possible without exceeding the scope of the invention which is defined in the appended claims.

The invention described herein may be manufactured and used by or for the Government of the United States of America for governmental purposes without the payment of any royalties thereon or therefor.

What is claimed is:

1. An apparatus for determining the elastic constants of metals comprising variable frequency means to subject a specimen bar to free-free vibrations, means for indicating the frequency of said vibrations, a support capable of supporting the specimen bar at a node, an electro-mechanical transducer connected to said support, and displaying means connected therewith to display the energy detected by said transducer.

2. An apparatus for determining the elastic constants of metals comprising a variable frequency oscillator, means for indicating the frequency of said oscillator, electro-magnetic means connected to said oscillator and mounted in close proximity to a specimen bar to subject the specimen bar to free-free vibrations, a means of support capable of supporting the specimen bar at a node, an electro-mechanical transducer connected to said support, and displaying means connected therewith to display the energy detected by said transducer.

3. An apparatus for determining the elastic constants of metals comprising variable frequency means to subject a specimen bar to free-free vibrations, means for indicating the frequency of said vibrations, an acoustical probe contacting the specimen bar at a node, an electro-mechanical transducer connected to said probe, and displaying means connected therewith to display the energy detected by said transducer.

References Cited in the file of this patent

UNITED STATES PATENTS

| 1,543,124 | Ricker | June 23, 1925 |
| 2,320,390 | Shmurak | June 1, 1943 |
| 2,486,984 | Rowe | Nov. 1, 1949 |
| 2,573,168 | Mason et al. | Oct. 30, 1951 |